(12) United States Patent
Zohn et al.

(10) Patent No.: US 6,560,335 B2
(45) Date of Patent: May 6, 2003

(54) SANITARY PHONE COVER

(75) Inventors: Robert Zohn, Scarsdale, NY (US); Robert A. Marks, Asharoken, NY (US); Joseph M. Herzog, Northport, NY (US); David Cowan, Brooklyn, NY (US); Jochen Schapers, New York, NY (US); Allen Bonder, Forest Hills, NY (US)

(73) Assignee: Phone Guard, Inc., Plainview, NY (US)

( * ) Notice: Subject to any disclaimer, the term of this patent is extended or adjusted under 35 U.S.C. 154(b) by 0 days.

(21) Appl. No.: 09/774,260

(22) Filed: Jan. 30, 2001

(65) Prior Publication Data

US 2002/0146115 A1 Oct. 10, 2002

(51) Int. Cl.⁷ .............................................. H04M 1/00
(52) U.S. Cl. ....................................... 379/452; 379/439
(58) Field of Search ................................. 379/452, 439

(56) References Cited

U.S. PATENT DOCUMENTS

| | | | |
|---|---|---|---|
| 2,507,375 A | 5/1950 | Hartwell et al. ............ 179/185 |
| 2,593,382 A | 4/1952 | Zimmermann ............... 179/185 |
| 2,607,862 A | 8/1952 | Panken ........................ 179/185 |
| 3,169,171 A | 2/1965 | Wachs et al. ................ 179/185 |
| 3,304,379 A | 2/1967 | Memmel et al. ............. 179/185 |
| D214,322 S | 6/1969 | Velasquez ..................... D14/3 |
| 3,962,555 A | 6/1976 | Efaw ........................... 179/185 |
| 4,570,038 A | 2/1986 | Tinelli ......................... 179/185 |
| 4,736,418 A | 4/1988 | Steadman .................... 379/451 |
| 4,751,731 A | 6/1988 | O'Connor .................... 379/439 |
| 4,819,265 A | 4/1989 | Colella ........................ 379/452 |
| 4,852,163 A | 7/1989 | Caceres ....................... 379/452 |
| 4,949,377 A | 8/1990 | Nishina et al. .............. 379/452 |
| 4,953,703 A | 9/1990 | Virginio ...................... 206/451 |
| 5,054,063 A | 10/1991 | Lo et al. ...................... 379/452 |
| 5,136,640 A | 8/1992 | Kim ............................ 379/452 |
| 5,396,557 A | 3/1995 | Tonci .......................... 379/452 |
| D380,477 S | 7/1997 | Williams et al. ............ D14/250 |
| 6,064,735 A * | 5/2000 | Wilkes ........................ 379/452 |
| 6,314,185 B1 * | 11/2001 | Lashley ....................... 379/452 |

* cited by examiner

Primary Examiner—Jack Chiang
(74) Attorney, Agent, or Firm—Philip M. Weiss; Weiss & Weiss

(57) ABSTRACT

Disposable sanitary covers for the earpiece mouth piece and handle of telephone handsets. The covers are designed to provide universal fit to the earpiece or mouth piece, regardless of its shape.

11 Claims, 7 Drawing Sheets

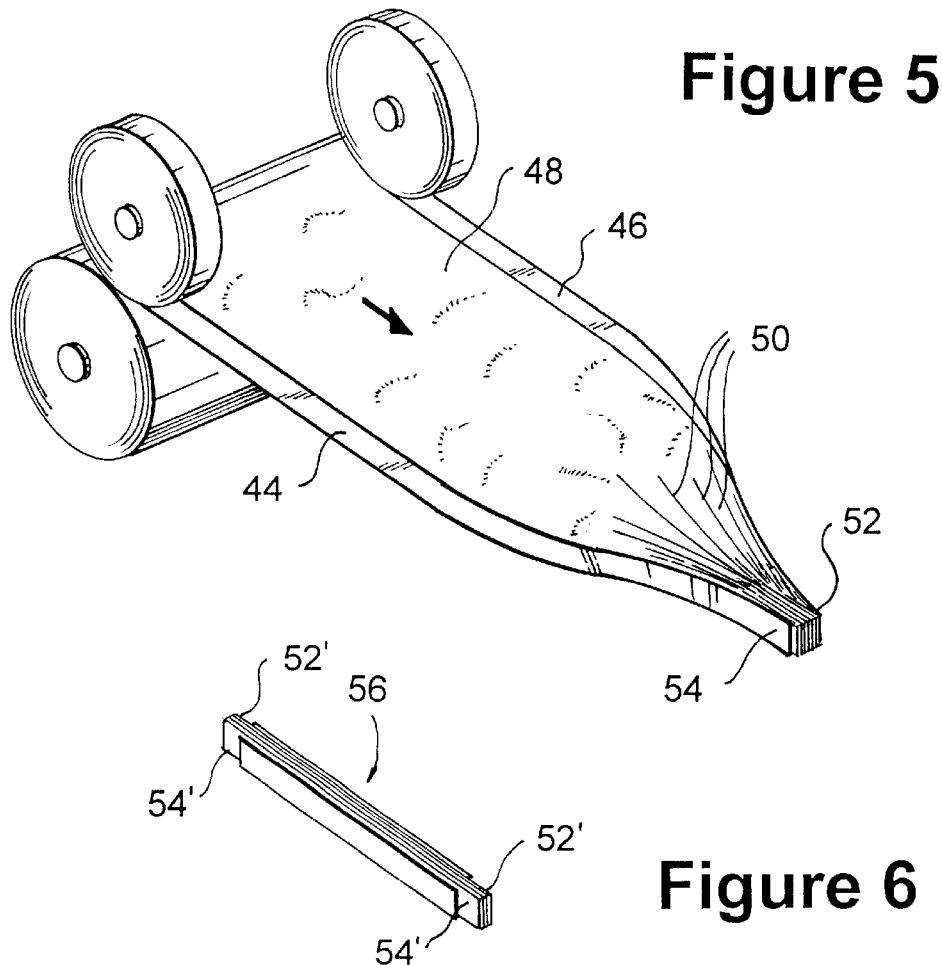
Figure 5
Figure 6
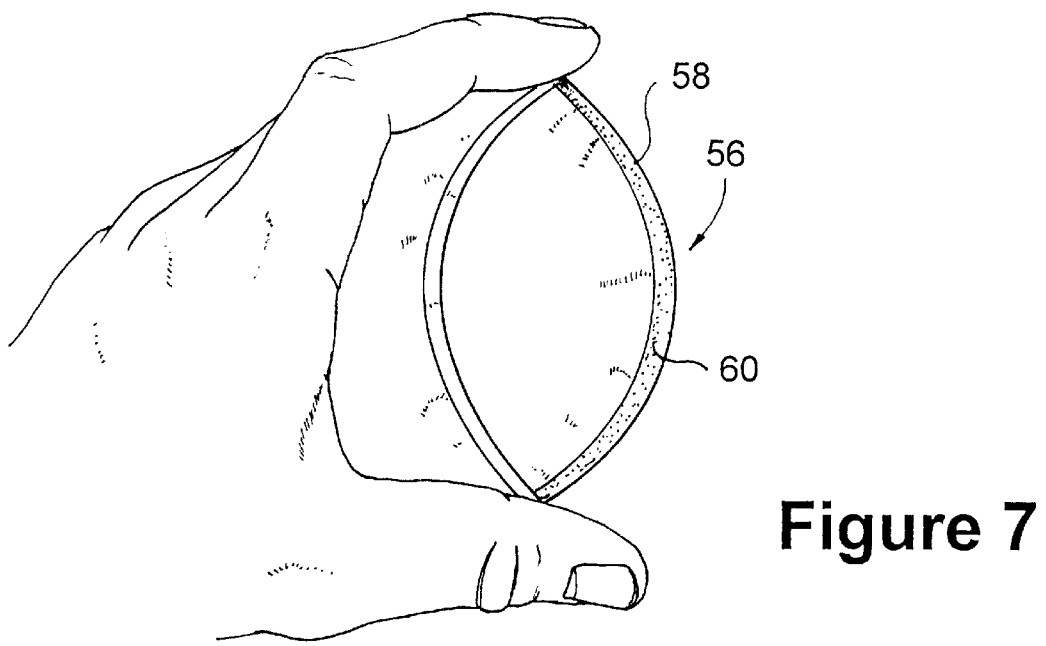
Figure 7

Figure 10
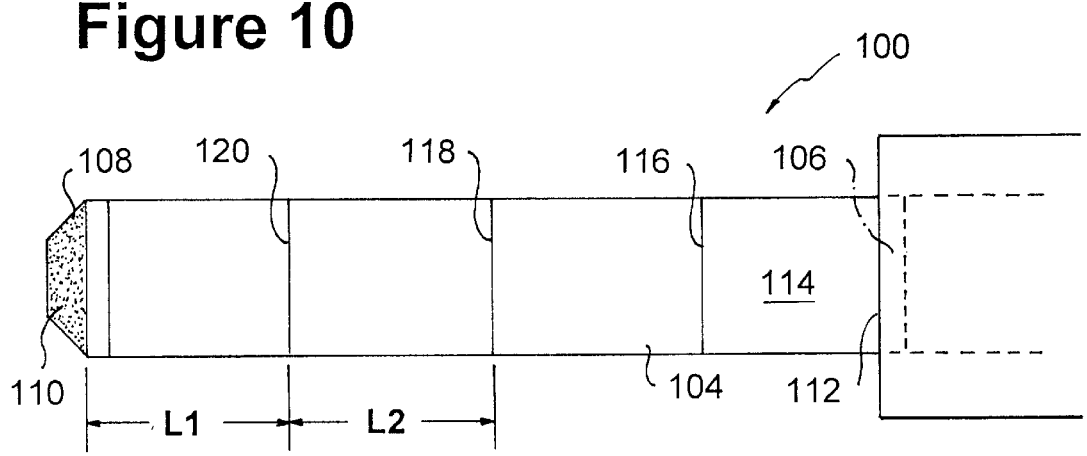
Figure 11a
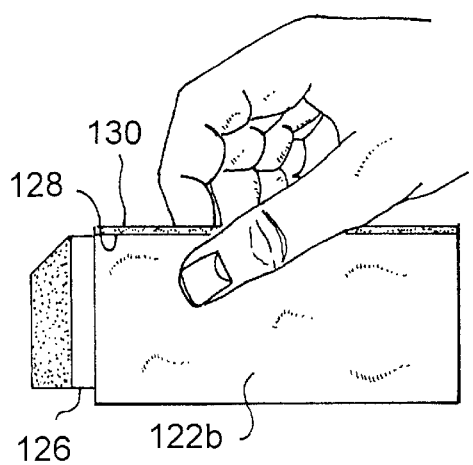
Figure 11b
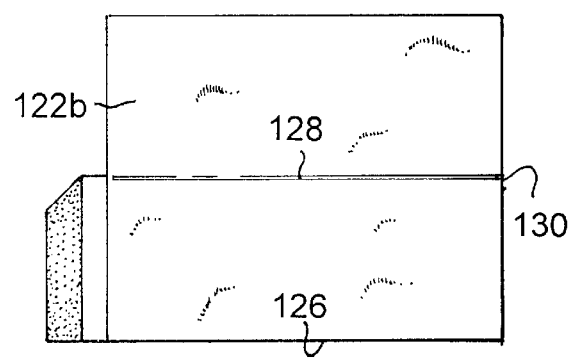
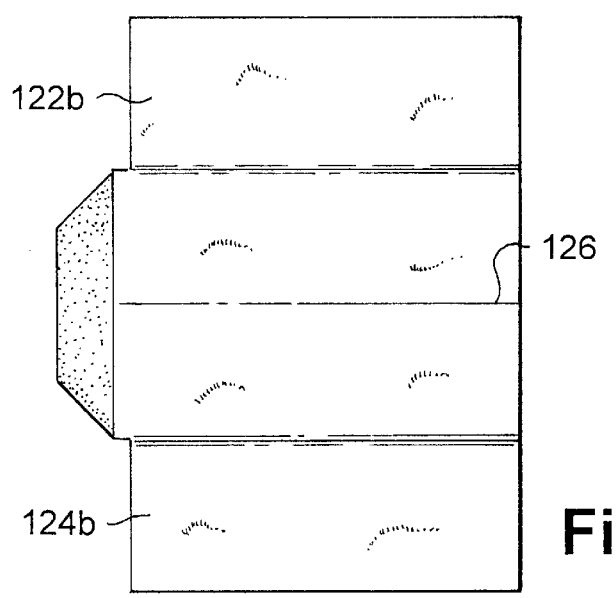
Figure 11c

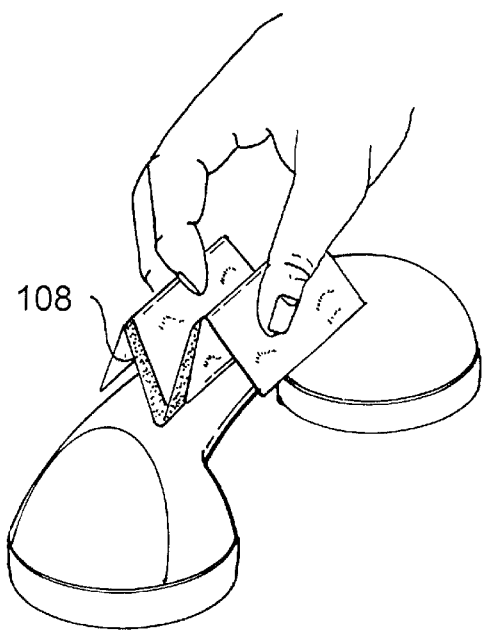
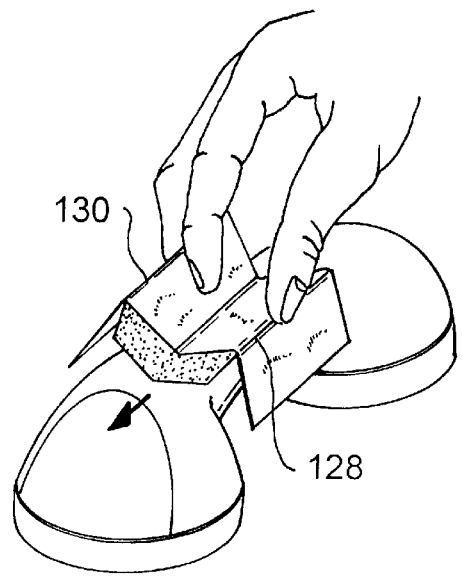
Figure 12  Figure 13
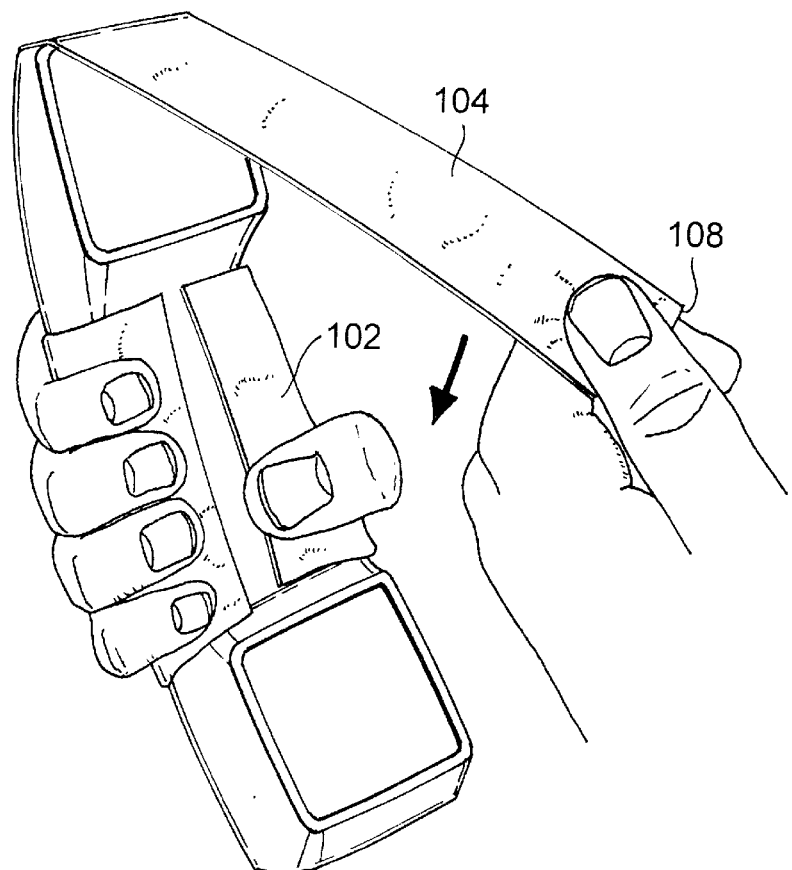
Figure 14

SANITARY PHONE COVER

FIELD OF THE INVENTION

The present invention relates to sanitary covers that are secured over the earpiece and/or mouthpiece of a telephone (or a doorknob) to reduce the incidence of contamination and infection therefrom

BACKGROUND OF THE INVENTION

The past 12 years has seen a dramatic increase in the incidence of infectious disease. Infectious disease is now the third leading cause of death in the United States. Just a few years ago it ranked only fifth. One factor in this dramatic increase is an increase in travel, and the resultant multiple use of telephones in public phone booths, airports, train stations, and even hotel rooms. In addition, the new global economy brings with it travel to and from the "third world", where the traveler may not fully understand the necessary sanitary practices. Both the increase in total travel time, and trip distance, increase risk of infectious disease. Even short trips are not free of risk, as personal hygiene practices have been all but forgotten. But perhaps the greatest danger arises from our complacency regarding disease: in this age of antibiotics. In fact, the pervasiveness of antibiotics may have created new dangers.

Wide spread use of antibiotics has resulted in new "killer" bacteria. These bacteria have grown resistant to most or all of our present antibiotics. This result is not unusual. All bacteria bred in the presence of antibiotics select out resistance strains, thereby increasing their resistance. Thus we find ourselves in a continuous and accelerating search for newer antibiotics and methods of protecting ourselves from the ever evolving bacteria strains.

Even hospitalization carries increased risk of infection. Hospitals are themselves the only source of certain new "killer" bacteria. These bacteria were literally bred, and evolved, in hospitals. Currently, two million (2,000,000) hospital patients per year contract nosocomial infections: infections contracted in the hospital, from the hospital.

Our schools are also a hot bed of infectious diseases, especially the nurse's office. Thus, travel, as well as hospitalization, and schooling, increase the risk of cross contamination; which greatly increases the spread of illness. This situation requires another approach to sepsis.

The eyes, ears, nose and mouth are common portals of entry for infection into the body. Telephones are brought into intimate proximity to these portals. Ever since the invention of the telephone there have been concerns about the possible spread of pathogens by multiple users of the phone. Investigations of these concerns have confirmed contamination of telephones. For example, on Jul. 2, 1999, an ABC News 20/20 Monday broadcast reported an investigation of "environmental surfaces", such as pay phones, restaurant salt & pepper shakers and napkin dispensers, shared computer keyboards and bathroom doors. As reported, students from Wagner College in Staten Island gathered microscopic samples from environmental surfaces, cultured them onto agar plates, and identified them. In interpreting the results, ABC News correspondent Dr. Johnson stated, "Many of the germs found were not dangerous, but in several places the telephone mouthpiece and keypad, the computer terminal, the bathroom door and on paper money they did find disease-producing forms of staph, which can cause anything from food poisoning to acne to boils."

In another examples Dr. Wallace reported, in the Dec. 12, 1992 edition of the Orange County Register, in Section G, page 10, that, " . . . colds are usually spread by simple hand-to-hand contact with another human being or such objects as doorknobs and telephones." With the increase in the number of phones, and the increased mobility of vacationers, business travelers, commuters and the workforce in general, phones have increasingly become vectors for disease.

The vast majority of bacteria are in the size range of 1–10 microns. Many of them form chains, are in pairs, or form clumps. They may be round or rod shaped. These bacteria can be easily picked up from the environment, and may cause disease. Objects exposed to droplets from coughing, oral secretions, nasal discharges, earwax (cerumen) and pus can be contaminated, and hands contaminated therefrom. Secretions can transfer bacteria to telephones, eyes, mouths, and other objects.

Bacteria produce disease, and at times extensive disease, in normal individuals. If there is any impairment to the immune system, or another disease is present, they can produce disease more readily, and more extensively. Diabetes mellitus, chronic lung disease, chronic heart disease, such as congestive heart failure, are some examples. Chronic skin conditions such as psoriasis, or any break in the skin, can increase susceptibility to infection. Impairment of the immune system caused by drugs, such as cortisone or chemotherapy, can vastly increase the body's predisposition to infections.

Staphylococcus is present in nasal passages, throat, sputum, droplets and hands. It is capable of producing a great many diseases or infections, including abscess, dermatitis, pneumonia, septicemia, endocarditis, gastroenterological diseases and many generalized diseases. It can be notoriously resistant to bacteria. Staphylococcus was present in cultures taken of various phones (see forward).

Bacillus can cause diarrheal disease, nausea and vomiting. It can also cause abscesses, cellulitis, endocarditis and other severe systemic disease. And, it can be transmitted from environmental objects.

Enterococus and related bacteria such as citrobacter, tatumelia, aerococcus, and enterobacter can all produce severe systemic disease. They are ubiquitous in the environment. The diseases produced by these bacteria range from gastroenterological diseases to abscess to cellulitis to endocarditis.

Pseudomonas can infect any tissue. It is also found on environmental surfaces, such as telephones and doorknobs, and can be transmitted by hand contact as well as from the oral, nasal and respiratory passages. This bacteria is the fourth (4th) most common nosocomial, i.e., hospital acquired, infection. It accounts for 10% of all such infections. These bacteria can produce pneumonia, dermatitis, generalized septicemia, dermatitis, etc. They can be spread by hand contact, sputum, and oral passages and from environmental surfaces. Sadly, they are tolerant to a wide variety of physical environments so they are very difficult to eradicate.

Stenotrophomonas is a newly described bacteria. It is generally a hospital-acquired infection. Quite serious outbreaks have developed in hospitals. It has been responsible for causing respiratory infections, wound infections and septicemia. This bacteria is resistant to many antibiotics Mycobacterium can cause severe disease. The most common is tuberculosis. This group will produce pneumonia, abscess and generalized diseases. They can be very difficult to treat, requiring multiple antibiotics and frequently developing resistance to these antibiotics.

In addition to bacteria, head lice and phone mites may be transmitted by the use of a telephone. Not surprisingly, many efforts have been undertaken to avoid both contamination and cross-contamination from telephones. Disinfectant sprays and wipes have been used, however, most bacteria easily survive a brief exposure to disinfectants, and the broad use of disinfectants leads to resistant strains of bacteria. In addition, use of disinfectants pose the possibility of allergic reactions and if in fluid form, may actually serve as a transport medium for bacteria.

Many attempts have been made to provide a physical barrier between the user and the phone. These have involved the use of materials which may provide an impervious barrier, and hence muffle sound or distort voice transmission, or those that have perforations or are wettable, and hence can transport the bacteria from the phone to the mouth, and visa versa. Barriers are used to cover the mouth piece, the earpiece, the earpiece and mouthpiece, and sometimes the handle. When away from home, the hands are more easily washed than the face or ears, hence covers for the earpiece have real usefulness. Individually packaged towelettes, and liquid products alleged to disinfect the hands without water, are readily available. In addition, gloves may be used. Covers for the entire earpiece and mouthpiece have also been attempted, but most are too cumbersome for a traveler.

With all the various arrangements of shapes and materials in telephone covers, the basic requirements of a sanitary cover still remain unmet. To aid in asepsis it is advantageous that a cover be disposable and biodegradable. A disposable cover needs to be inexpensive, and easy to manufacture. The cover should be packaged so that it retains its aseptic condition through much joggling in the traveler's pocket or luggage pouch. In addition, it should be possible to deploy a cover without contaminating it with dirty hands, and without the hands touching the earpiece or mouthpiece. Preferably, one should be able to deploy the cover using only one hand. If the covers are presented in a multi-pack, opening the pack and deploying one cover should not contaminate the remaining covers in the pack. The covers are preferably sound permeable but fluid impervious. Prior attempts at sanitary covers meet some of these requirements, but failed to meet others. It is important at this time to meet them all. Hence, there remains a great need for a small, inexpensive, portable sanitary cover for the telephone.

SUMMARY OF THE INVENTION

The phone covers of the present invent ion are unique. They are designed to prevent contamination, and cross-contamination, with the use of a phone (or doorknob). The covers of the present invention place a bacterial barrier material between the head, the earpiece or mouthpiece. In a preferred embodiments the cover also creates a bacterial barrier between the hands and the phone, as well as the head and the phone. The bacterial barrier filter material is preferably made of a non-woven fabric and, most preferably, of a sheet of polypropylene, biodegradable material having a filtration efficiency of 99% with an effective pore size of one (1) micron. Since the majority of bacteria fall in the size of 1–10 microns, this barrier will be extremely effective. It has proven voice transmission characteristics, as it has been used in face masks. In fact, no distortion of voice transmission takes place from the use of the covers of the present invention. They may, however, filter outs or deaden, background noises.

The covers are made in a variety of configurations, and each cover of the invention may be easily used on phones of any shape. The covers are easily applied with one hand, and come in convenient, easy to carry, packages. The covers and cover packages may be sterilized, and are designed such that their use is both aseptic and discrete. Using the constructions of the covers of the present invention, the earpiece and/or mouth niece covers may be constructed from a piece or template of sheet material of any shape. The template is provided with retaining means to permit use of the covers on phones with any shape earpiece or mouth piece. For instance, either a round or square template of material, may be used to form a cover for an earpiece or mouth piece which is either round or square, or any shape in between. It is preferred that the covers be made of fluid resistant material.

The smallest and simplest covers are the single sheet covers, which, adhesively attach to the working surface of the earpiece and mouthpiece. For obvious reasons, these covers are inappropriate for use on doorknobs. For the single sheet covers, the template needs to be simply larger than the anticipated area of the top surface of the earpiece or mouth piece, and any shape will do.

In one embodiment of the single sheet cover, adhesive is provided only along a portion of the edge of the template. With this single sheet cover it is preferred that the cover have some stiffness, so that the adhesive and the stiffness combine to ensure the entire sheet remains against the earpiece or mouth piece, i.e. that it does not fold to expose a portion of the earpiece or mouth piece. As this cover does not extend about, or contain, the earpiece or headpiece, this cover may be constructed of material, such as compressed paper or cardboard, which does not easily transmit sound, as the sound will be easily transmitted around the edge of the single sheet. The templates, or sheets, are stacked so that the edge with the adhesive portion alternates from one side to the opposite side of the stack, with each sheet. This stacking of the covers provides two advantages. First, it permits easy dispensing from the stack. Pressing the cover to the earpiece or mouthpiece initiates an adhesive bond to the cover. As most pressure sensitive adhesives have greater tack than peel adhesion, pulling the earpiece or mouthpiece away from the stack at an angle, will easily separate the top cover of the stack (attached to the handset) from the next cover in the stack. Second, alternating adhesive positions makes it especially easy to cover both ends of the hand set. As will be rioted with reference to FIGS. 8 & 9 and their accompanying description, these single sheet covers are most preferably attached such that the adhesive portion of the cover is placed at the upper end of the earpiece and the lower end of the mouth piece. After attaching the first cover to one end of the handset(the earpiece or the mouth piece) the alternating stack places the adhesive portion of the second cover in position for fastening to the other end of the handset, i.e. without having to rotate the stack.

In another embodiment of the single sheet cover, adhesive is provided in star-shaped pattern, which will engage any shape earpiece or mouthpiece. In this embodiment, the material requires no stiffness, arid, in fact, the drape in the material will facilitate adhesion about the edges of the earpiece or mouthpiece. Because the adhesive pattern is uniform, when separating the first cover (mounted to the earpiece or mouthpiece) from the remaining stack of covers, a circular motion, rather than a rocking motion, is used to achieve a peel. This may be easily accomplished if the stack is hand held. Alternatively, the circular peel may be achieved by a resilient sponge, or moldable fluid reservoir at the base of the stack of covers. Where the single sheet covers are stacked and packaged, it is possible to achieve, one hand deployment of the cover to the earpiece and mouthpiece by providing means to attach the package to a nearby surface. Much emphasis is given to the packaging and deployment of the covers, as aseptic, one-handed, deployment is vastly preferred.

A fuller cover is provided by the hat-like embodiments of the covers of the present invention. These covers use a larger template and adaptable retaining means, to create a bonnet or hat-like cover. In one hat-like design, circular or square templates of barrier material are provided with elastic retaining means attached to at least about half the perimeter of the template. When using this design, the barrier material requires considerable drape so that the elastic retaining means is able to retain the cover on the earpiece or mouthpiece. In another hat-like design, the fuller cover is constructed of a template of barrier material, pleated, and provided with flexible, resilient portions, along the outer pleat at both sides of the template, to form a stick-like shape. At either end of the stick, the pleats and the flexible, resilient portions are firmly secured, as with a staple, plastic or otherwise. Alternatively, the ends may be secured by heat welding. When the two ends of the stick are pressed toward each other the flexible resilient portion flexes to expand the pleats. In this condition the cover may be disposed about the end of the earpiece or mouthpiece. When the pressure on the ends of the stick is released, the flexible resilient portions straighten, closing, and securing the cover by tension, on the earpiece or mouthpiece. Further securement may be achieved by a nonstick coating, such as a series or pattern of rubber dots, on the inside surface of the resilient portions.

Another fuller, hat-like cover is achieved with a circle of pleats, creating a cover, which looks much like a chef's hat, or inverted paper cup. This pleated cover, however, does not have a hat brim or cup lip. The pleated cover is retained on the earpiece and mouthpiece by a twisting motion of the hand, which individually shapes the cover to the earpiece or mouthpiece. This requires that the material of the template and its pleats be easily moldable and not resilient. The twisting action creates a line of retaining means comprising newly-angled pleats. A brim or lid would work against the formation of such retaining means. These covers are easily stackable and designed for easy and safe disposal.

Another embodiment of the present invention is the complete sanitary cover. This cover is recommended for hospitals and other medical facilities, and is preferably sterilized. This complete sanitary cover has a handle portion for making a handle grip, and a wrap portion for deployment along the handle, over the earpiece, and down across the mouth piece. The wrap portion is fastened to the phone by an adhesive tab at the end of the wrap portion. The handle portion and wrap may be made of two templates of different materials, the wrap joined at right angles to the handle portion. Alternatively the same material made be used for both templates, with stiffening provided in the handle portion. The present invention offers an inexpensive complete cover that can be deployed with one hand, without ever directly touching the telephone.

By using our specially designed, easy-to-store and-apply, sanitary phone covers, the user helps prevent the passing of germs from telephone handsets, public and private, to the users mouth ears, nose and eyes. In addition, perhaps serendipitously, the covers of the present invention filter out background noise, making the telephone conversation clearer, to both the speaker and the listener. Also, there is no degradation of the voice transmission when using the covers of the present invention.

BRIEF DESCRIPTION OF THE DRAWINGS

FIG. 5 is a schematic view of a method of manufacture of another hat-like embodiment of the cover of the present invention.

FIG. 6 is a perspective view of the cover formed in FIG. 5 before placement on the earpiece or mouthpiece of a telephone.

FIG. 7 is a perspective view of the cover of FIG. 6, with the ends pre-tensioned for placement over an earpiece or mouthpiece.

FIG. 10 is a bottom plan view of the complete sanitary cover embodiment of the present invention.

FIGS. 11a–11c, are top plan views of the cover of FIG. 10, illustrating a sequence of folding the cover.

FIG. 12 is a perspective view illustrating the deployment of the cover of FIGS. 10 and 11.

FIG. 13 is a perspective view of the cover of FIGS. 10–12 showing the next step of deployment, the handle being placed about the handle of a telephone earpiece and mouthpiece.

FIG. 14 is a perspective view of the cover of FIGS. 10–13, with the handle about the earpiece and mouthpiece handle, illustrating the placement and securement of the wrap portion of the cover.

DETAILED DESCRIPTION OF THE PREFERRED EMBODIMENTS

Figure 1:
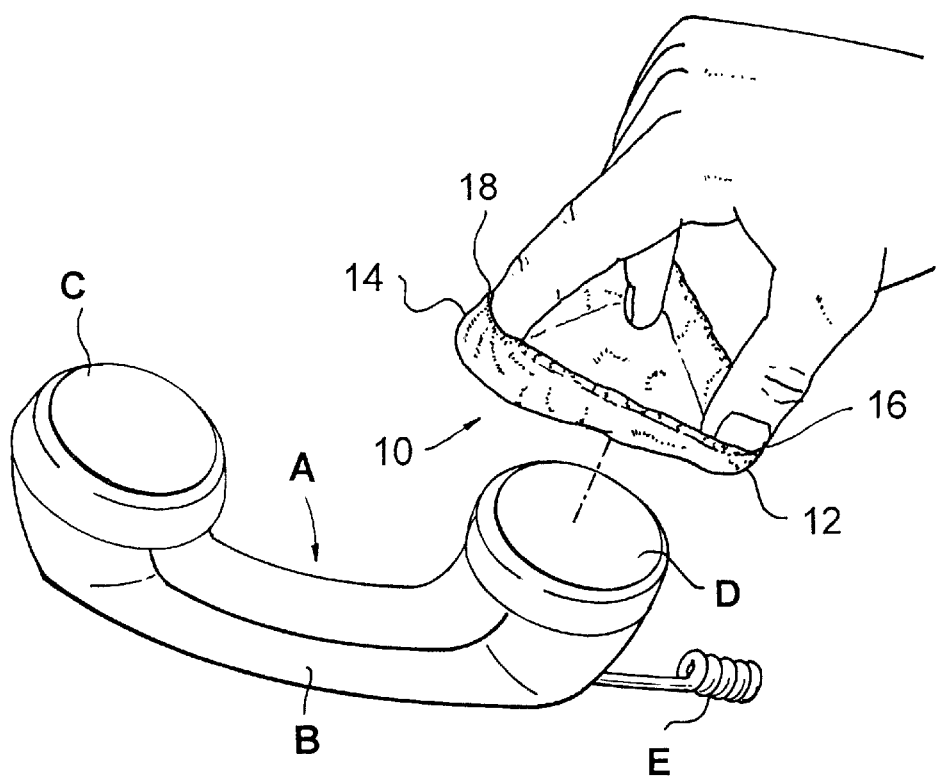
FIG. 1 is a perspective view of a hat-like cover of the present invention, about to be placed over, the mouth piece of a telephone handset.

FIG. 1 illustrates the first of the hat-like covers of the present invention. The covers of the present invention are intended for use with a telephone earpiece and/or mouthpiece, substantially as shown in FIG. 1. The handset, A, comprises a handle, B, having two ends, and an earpiece, C, and mouth piece, D, at the two ends of the handle. The phone may also have a cord, E, connecting it to receiver, or mounting hook. The cover, shown generally at 10, Is manufactured from a sheet of flexible, bacteria proof material, 12, which is preferably a non-woven material, having good drape. In its most preferred construction, the cover comprises a circular template, 14, about 5 inches in diameter is provided with a retaining means, 16, comprising a rubber or elastic band, 18, sewn to the template about its circumference. A circular template is not requires however, as a rectangular template with parallel elastic bands attached along opposed sides will also produce a suitable over, which, though it may not look like a hat, will look similar to the hat-like over once it is disposed on the end of a handset.

As used throughout this specification, "template" is used to describe a piece of material, in sheet form, of a shape, and having the properties, to be made into a cover by further manufacturing steps. For instance, the template must be supplied with retaining means to hold it to the phone. The phrase "universal template" is used to emphasize that any shape template, from circular to rectangular, may be used in covers for earpieces and/or headpieces of phones which may circular, rectangular, or any shape in between.

Figure 2:
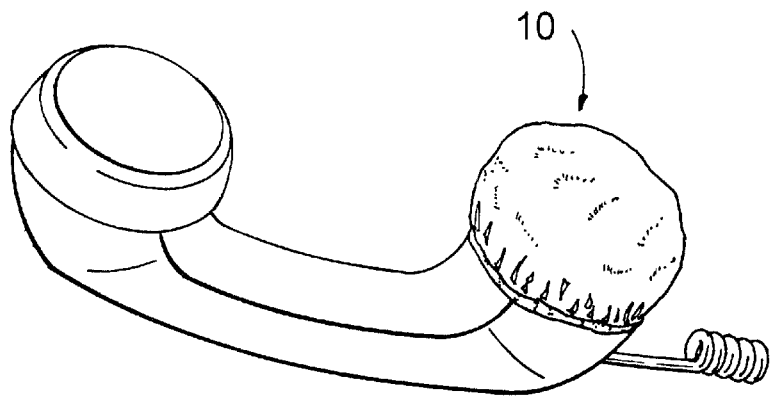
FIG. 2 is a perspective view of the cover of FIG. 1, secured about the mouth piece of the headset.

As shown in FIG. 2, the retaining means maintains the cover about the mouth piece of the handset. In alternative constructions, the rubber band may be glued to the template, or encased in a hem about the circumference of the circular template.

It is preferred that these covers be inside-out when packaged for use, so that the covers may be easily picked up with the fingertips, as shown in FIG 1. Subsequently the cover may be positioned atop the e.g., mouth piece, and flipped rightside-out about the mouth piece of the handset as shown in FIG. 2.

This cover may be adapted for use on a wide variety of earpiece and mouthpiece structures. For instance, a circular template cover could be place on a square mouth piece, as the retaining means easily adapts to any shape mouth piece. In addition, with the elastic retaining means, a rectangular template of material may be used to create covers for round and square phones. To make rectangular covers with elastic retaining means, a high speed, continuous manufacturing process could attach elastic bands along the edges of a continuous strip of material of, e.g., 5 inch width. Following attachment of the elastic, the elastic/material composite strip could be separated into covers of up to about 5 inches in length. If the elastic bands are attached in symmetric sinuous lines, and the material trimmed to the lines, the covers would appear almost circular.

The fibrous material used must permit sound transmission, but eliminate contact with the mouth piece. The covers made therefrom will be lightweight, and both easy and inexpensive to manufacture. In addition, they will be compact and preferably, manufactured of biodegradable sheet material.

U.S. Pat. No. 2,593,382 illustrates a sanitary telephone cover that incorporates an elastic band. The band is used to retain the cover on the phone, however, the cover is shaped and rigid, and will fit only round mouth pieces of a particular dimension. Larger round mouth pieces, and other shaped mouth pieces, e.g., square mouth pieces, cannot be rendered sanitary with the covers of U.S. Pat. No. 2,593,382.

Figure 3:
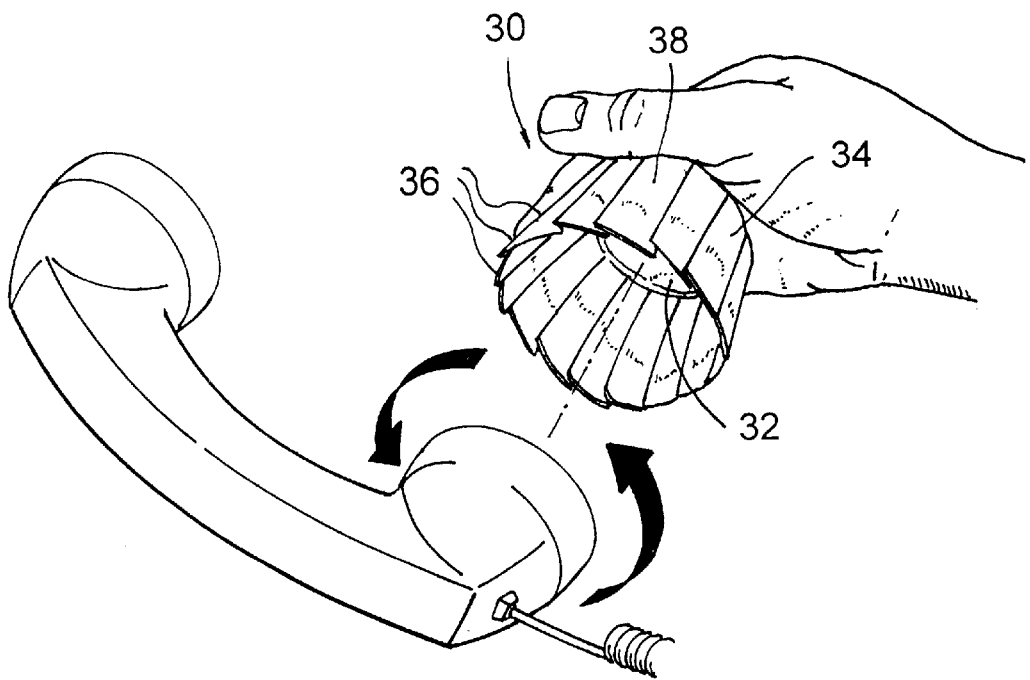
FIG. 3 is a perspective view of another embodiment of the hat-like cover of the present invention, shown just prior to being placed over the mouth piece of a telephone earpiece and mouthpiece.
Figure 4:
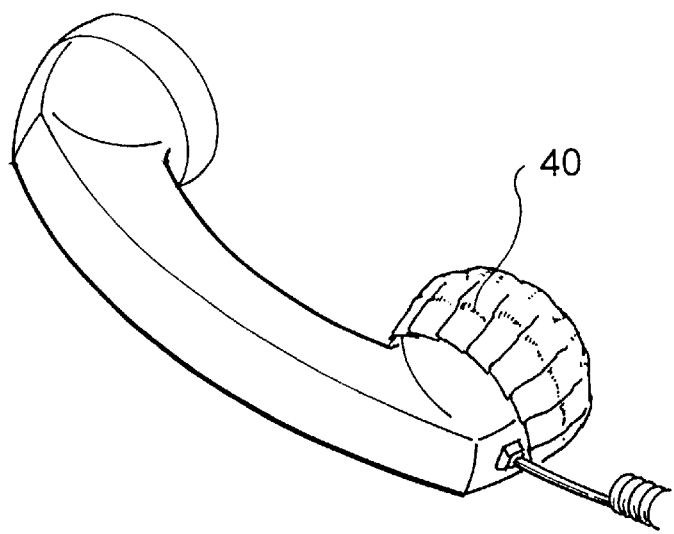
FIG. 4 is a perspective view of the cover of FIG. 3, secured about the mouthpiece.

FIGS. 3 and 4 illustrate another hat-like cover according to the present invention. In the particular embodiment shown, the cover, 30, is pleated into a frusto-circular structure with a flat top, 32, and sloping sides, 34, created by the pleats, 36. In the hat-like embodiment pictured, the top preferably has a diameter of 2.25 inches, and the height of the cover is 1.25 inches. The cover is made of a compliant material stiff enough to retain a pleat, but with little resilience. As shown in FIG. 3, the frusto-circular shape is achieved with a circular template, 38. However, it is not required that the template be circular. A rectangular may also be pleated to a frusto-circular shape, albeit with and uneven base. Because the sides are sloped, a cover made from a round or square template may be fitted on a round or square mouth piece (or earpiece). FIG. 3 illustrates how the cover is deployed on and secured about the mouth piece. As indicated by the arrows, the cover is placed over the mouth piece, and then rotated. If pressure is applied about the base of the frustrum during the rotary motion, a line of crimped re-pleats, 40, in FIG. 4, form over the backside, or region of decreased diameter, retaining the cover on the mouth piece.

The material used to form the cover of FIGS. 3 and 4 is a fluid impervious and bacteria proof material. It may be possible to form the cover of a paper like material that will re-pleat, but a waxed or plasticized material may be preferred in the sides, as it is especially easy to pleat and re-pleat. Under no circumstances can apertures be formed in the top of this cover to improve sound transmission. Apertures not only break the bacterial barrier, it is difficult to make apertures small enough to contain the mites found in many phones. Adhesive may be added to the bottom surface of the cover top, to retain the top against the contours of the mouth piece, to assist in retaining the cover on the mouth piece both prior to and after re-pleating.

U.S. Pat. No. 4, 652,163 discloses a telephone mouth piece cover pleated to form a frusto-circular cover. The pleated skirt as shown cut-out to accommodate the handle. The pleats of the cover of the reference are not re-pleatable, as they are are reinforced with ribs. As claimed in the reference, the skirt portion is 23 millimeters (less than one-half inch) in height. In the description of the invention of the reference, the material of the cover is described as paperboard at least 6 mils thick to provide the rigidity required for stiff attachment to the mouth piece. Though the patent states that the flare of the skirt accommodates varying sizes of mouth pieces, it is clear from the complete description of the patent that the range of sized accommodated is quite small compared to the cover of the present invention, and that varying shapes are not accommodated. Considerable effort goes into manufacturing the covers of the issued patent, with the internal ribs. The cover of the present invention is much easier to manufacture. In addition, the retaining means of the cover of the present invention, the repleats, are of sufficient strength to retain the cover on the earpiece of a phone. Hence the retaining means adapts the cover for use on many different size and shape phones, and may be used on the earpiece as well as the mouth piece.

U.S. Pat. No. 2,607,862 discloses a telephone mouth piece cover with resilient reinforcing bead means which give elastic quality to the cover to hold it in frictional engagement on the phone. However the dome-like body of the cover is not gathered by the bead, and the bead prevents pleating, hence the covers are limited to the original dome shape and not adaptable to many sizes and shapes of phones. Another telephone cover is depicted in U.S. Design patent Ser. No. 380,477. The cover is a preformed cap-like shape, limiting is range of adaptability. In addition, it has perforations; unacceptable in a good cover. Lastly, the cover is allegedly secured to the phone solely by adhesive provided under the flat top of the cover. Such an arrangement can provide only questionable securement, as the top of the mouth piece or earpiece may well not be flat, limiting the amount of contact of the adhesive with the phone.

U.S. Pat. Nos. 2,593,382 and 3,169,171 illustrate further telephone covers utilizing pleats of crimping for enhanced fit, but always with stiff rib members that limit the use of the covers to a particular size range of round mouth pieces, and in the case of the latter patent, earpieces.

FIGS. 5–7 illustrate another hat-like embodiment of the present invention, in a "stick-like" cover which pops open for use. The construction of this cover is perhaps best understood in relation to its manufacture, represented schematically in FIG. 5. Continuous strips 44 and 46 are joined to the edges of a continuous layer, 48, of porous, bacteria proof non-woven fabric, by e.g. adhesive or heat sealing. Strips 44 and 46 constructed of a flexible, resilient material such as cardboard or plastic, such as polystyrene. After the strips are joined to the fabric layer, the strip/fabric layer composite is then folded a number of times, e.g. 9 folds, 50, and secured at the ends, 52 by appropriate means, 54, such at staples, stitches, adhesive or heat sealing. As shown in FIG. 6, the covers, 56, are separated from one another. If desired, the leading end 52' of the cover in production may be secured, as at 54' prior to separating the finished cover from the covers in production.

The cover as originally formed looks kind of like a stick, and needs to be opened to be disposed on a mouth piece of a telephone earpiece or mouthpiece. As seen in FIG. 7, the ends of the cover, when pre-tensioned toward each other "pop open" the cover for disposition on the earpiece or mouthpiece. For added gripping to the earpiece or mouthpiece, the inside surface, 58, of the strips may have a non-slip coating, 60, of e.g. silicon or rubber. This cover has a universal design, and can be easily used with earpiece and mouthpieces of varying sizes and shapes. An optimum cover may be constructed with a fabric layer about 5–6 inches wide, and strips about 0.4 inches wide and about 0.03 inches thick, cutting the composite to a length of about 4.3 inches. Preferably the cover is has an odd number of folds. It is essential that tensioning of the ends does not result in a simple flexing of the "stick-like" cover into a C, but actually opens the cover. Therefore, it is preferred that the strips may have a slight, resilient arch, to partially open the covers, or a pre-folded transverse center kink to assist opening the cover to a hat-like shape with a brim formed by the strips.

U.S. Pat. No. 3,304,379 disclose a cover with side strips. The cover is not pleated, though it is formed of creped paper, or other elastically extensible material. This is not equivalent to the pleats, as the covers of the present invention pop-open, and no cross directional force need be applied to extend the cover material for fit or placement on the telephone. The patented cover also has a rather complicated manufacturing step of making cutouts in the fabric layer. This yields a cover, literally, with holes in it. In addition, the cover requires substantial packaging to preserve the delicate crepe paper hood. Lastly, this cover even lacks the narrow profile to fit it (and others) conveniently in a pocket or handbag.

These pop-open covers are preferably individually wrapped to maintain asepsis. The covers with elastic retaining means may be turned inside-out and stacked in a multi-pack. Similarly, the cover with re-pleated retaining means may be nested in a multi-pack. However, all of the hat-like covers allow the user to place the cover on the phone, and remove the cover from the phone, with little danger of their hands contacting the phone.

Figure 8:
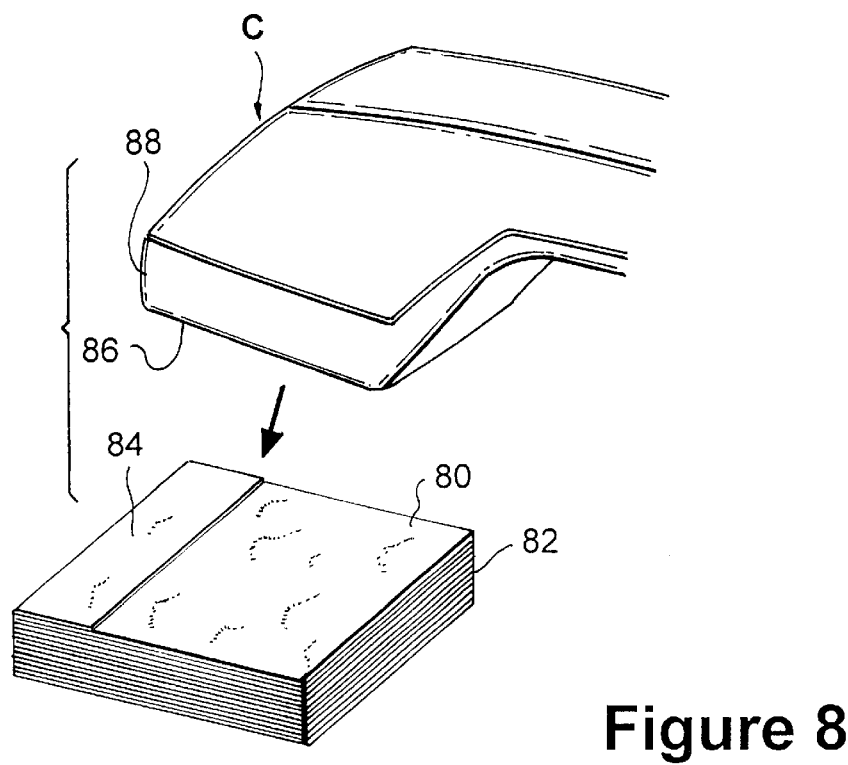
FIG. 8 is a perspective view of a sheet type embodiment of the cover of the present invention, stacked, and ready for placement on the earpiece and/or mouthpiece.
Figure 9:
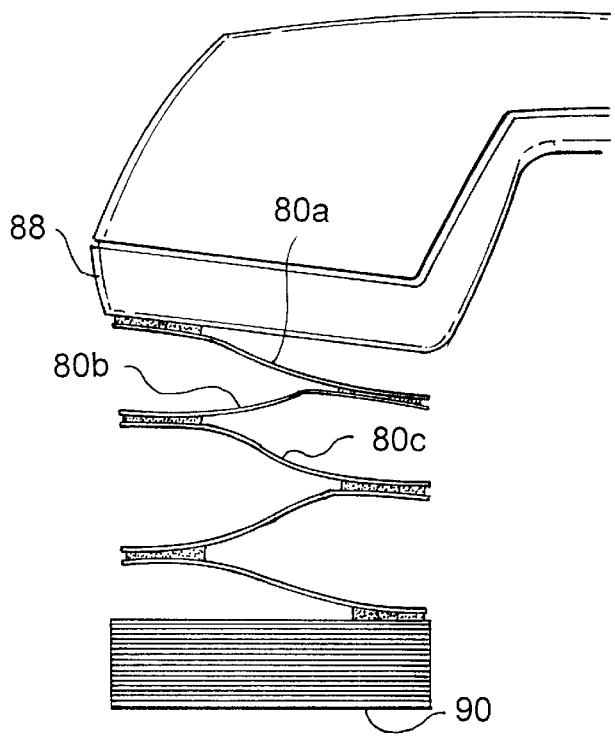
FIG. 9 is a side view of the stack of covers of FIG. 8, with the top cover attached to the earpiece.

FIGS. 8 and 9 illustrate one of the single sheet embodiments of the cover of the present invention. As illustrated, the cover, 80, has a square template, or shape, however there is no limitation to shapes in which it may be produced. The cover, 80, has a band of adhesive material., 84, along an edge. Like covers may be provided in a stack, 82, and, if desired, packaged with the adhesive band facing up. The covers are made of paper or non-woven fabric, as sound transmission through: the cover is not as important with the single sheet covers, as they do not encase the phone. To dispose the cover on the phone, the upper edge, 88, of the working surface, 86, of the earpiece, C, is pressed against the adhesive, 84, to fasten the cover to the earpiece. When so fastened, the cover extends across the working surface of the earpiece. It is desirable that the cover be easily releasable from the earpiece after use, hence the adhesive should have a release feature. Pressure sensitive adhesives are particularly suitable for use n this cover.

When the covers are stacked, it is important that the edges with the adhesive bands are not aligned. In a preferred stacks the adhesive edges are alternated, at opposite sides of the stacked square covers, as shown in FIG. 9. As the adhesive strength of the adhesive fastening to the earpiece, usually referred to as the tack, is generally greater than the peel adhesion, the top cover, 80a, may be easily peeled from the second cover, 80b, in the stack. However, if very strong adherence to the phone is desired, it may be advantageous to include a release surface on the bottom surface of the cover, 80a, to meet the adhesive band of cover, 80b.

Placing the adhesive bands at alternating sides of the stack of covers makes it easy to mount covers at the top edge of the earpiece, and the bottom edge of the mouth piece. As with the previous covers the cover 80 is, preferably, made of a bacteria proof material such as a non-woven fabric. It is also required, that the material has sufficient stiffness to extend across the working surface of the mouthpiece/earpiece. This is necessary to prevent folding of the template, and exposing the mouth piece/earpiece. The adhesive and release materials may be used to stiffen the material, however, it is preferred that adhesive does not extend over the entire area of the cover to facilitate separation of the cover from the stack It should be noted that the covers might be round or square, or any shape. A round cover may be used with an earpiece and mouthpiece having a square end, if the cover is slightly oversized for average earpiece and mouthpiece with circular ends. Thus the circular covers are preferably made just slightly larger than the average earpiece/mouth piece. It is also preferred that the square covers be made slightly larger than needed for a square earpiece/mouth piece. When the shapes of the earpiece and/or mouthpieces and covers are not matched, the region of adhesive contact will probably be smaller than if they were matched, however, if the adhesive has sufficient tack, the covers can be used with most all earpiece and mouthpieces. It should be noted that phone booth headsets currently have round earpieces, and if desired, the covers could be rounded. in this instance, the adhesive band would extend partially about the circumference, and might be color-coded so that the user could easily fasten the top cover to the phone. If the stack, 82, has an adhesive undersurface, 90, the user may attach covers to the earpiece and mouthpiece quickly, with just one hand.

U.S. Pat. No. 5,054,063 discloses a multi-layer cover, constructed of a layer of soft fabric, and a layer of water impermeable material. The covers of the present invention have only one layer. In addition, the patented cover has an additional stiffening layer created by the means for bonding the first and second layers. As shown, the cover has another full layer, a fourth layer, of adhesive for fastening the cover to the phone. These covers contain far too much material, contributing too much stiffness and expense.

FIGS. 10–14 illustrate an embodiment of the complete sanitary cover of the present invention. This cover, 100 is a composite of a handle portion, 102, and a wrap portion 104. While the wrap portion is drapeable, the handle portion is preferably formed of a stiffer material. The wrap portion is preferably a porous bacterial barrier fabric. It may be attached to the handle portion in region of attachment, 106, by adhesive, heat sealing, or other inexpensive, reliable bonding means. The wrap portion may be fastened to the upper surface or the underside of the handle. The cover, shown generally at 100, includes a tab, 108, with adhesive means, 110, which may be provided with a cover sheet (not shown). The wrap portion, 104, is of considerable length, to extend around the top of the earpiece and mouthpiece, across the earpiece and mouth piece as shown in FIG. 14.

For ease of use, the covers are folded in a precise manner so that they may be easily, and safely, used, and deployed in aseptic condition on the earpiece and mouthpiece. Folding of the wrap portion is achieved by an equal number of forward and reverse folds, so that the tab remains outside the handle. By conventional definition, a forward fold brings together the right sides or top surface, and reverse folds bring together the wrong sides or bottom surface. FIG. 10 is a plan view of the bottom, surface of the handle and wrap portion. As shown, the reverse sold along line 112 brings bottom surface of panel 114 atop the bottom surface of the handle portion, and a forward fold along line 116 brings the tab back to the left of the handle. The last pair of reverse and forward folds, 118 and 120, respectively, must be placed such that the last panel has a length, L1 which is greater than the length, L2 of the next to last panel.

FIG. 11c depicts the composite cover after the wrap portion has been completely folded. The folded wrap portion covers the undersurface of the handle portion except for panels 122 and 124. The folded composite as shown in 11c is then folded, in a forward fold along line 126. Finally, reverse folds are made along lines 128 and 130, revealing the topside of handle panels 122 and 124. In this final-folded form, as shown in FIG. 11c, the cover may be packaged, and easily deployed on the earpiece and mouthpiece, to provide an aseptic cover.

On unwrapping the package, preferably a foil wrap (not shown), the folded cover may be grasped along its top edges, near fold lines 128 and 130, and placed against the handle of the handset. The top edges must be held together, as the resilience of the handle materials together with the bulk of the folded wrap portion urge the two top edges apart. Once the composite is placed on the handle of the handset, the finger grip may be released, allowing the top edges to separate, as shown in FIG. 12. One finger is used to hold the region of the cover near line 126 against the handset. The remaining fingers may be used to urge the top edges down and about the edges of the handle of the handset, as seen in FIG. 13. The tab, 108, may then be grasped, i.e. by the fingers of the left hand, and pulled in the direction of the arrow, to unfold the wrap portion. The wrap portion may then be pulled about the top of the handset and stuck to the bottom of the mouth piece, as shown in FIG. 14. With this cover, the earpiece, mouth piece, and handle are covered. This complete sanitary cover is independent of the shape of the various parts of the earpiece and/or mouthpiece. As designed, the cover avoids any cord attachment to the earpiece and mouthpiece.

FIG. 3 of U.S. Pat. No. 4,949,377, and FIG. 2 of U.S. Pat. No. 4, 751,731 disclose earpiece and mouth piece covers connected by an elongated member. This elongated 10 member does not protect the palm of the hand from the handle of the earpiece and mouthpiece. U.S. Pat. No. 3,962, 555 and Design Pat. No. 214,322 disclose handle covers deployed from the underside of the handle, requiring contamination of one hand to lift the earpiece and mouthpiece and expose the underside of the handle to receive the cover.

Figure 15:
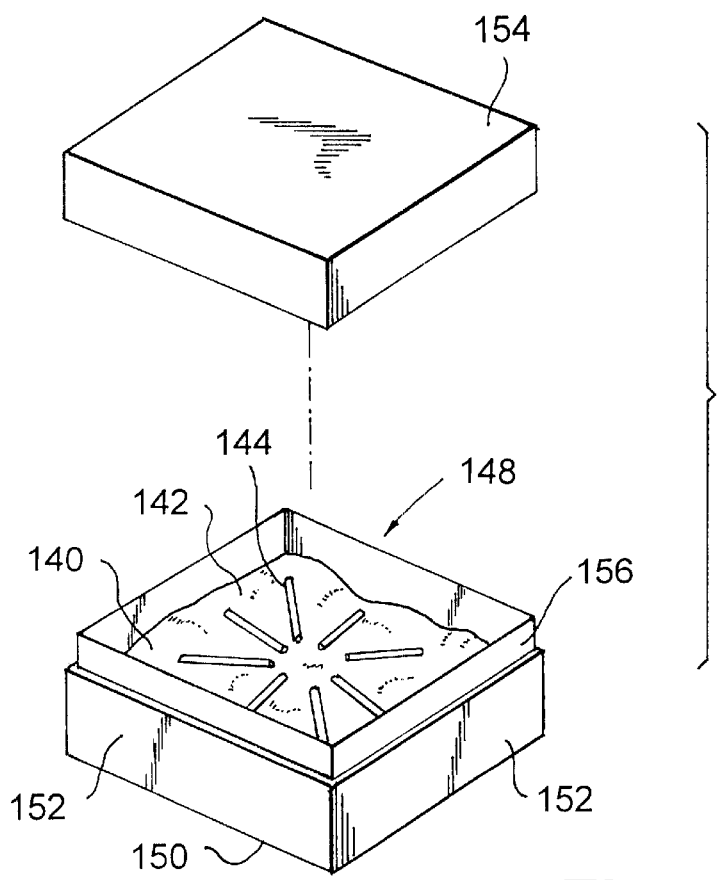
FIG. 15 is a perspective view of another embodiment of the sheet-type cover of the present invention, stacked, in a container.
Figure 16:
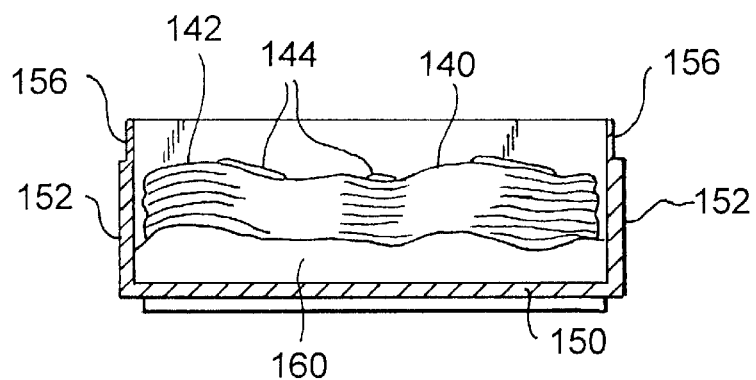
FIG. 16 is a cross-section of the stack and bottom of the container, taken along lines 16—16 of FIG. 15, having means for mounting the container on an available surface before deploying the cover, to facilitate one hand deployment of the cover.

Another embodiment of the single sheet covers of the present invention is shown in FIGS. 15 and 16. As shown, the covers, 140, comprising template, or sheet, 142, of bacterial barrier material, and radial adhesive pattern, 144. These covers may be sold in a stack, 146. To deploy the covers on the handset, the earpiece or mouth piece is pressed against the adhesive pattern, and the cover is released from the stack as the handset is moved away from the stack. Once attached to the earpiece or mouthpiece, release of the top cover from the remaining stack may be aided by a rotary motion of the earpiece or mouth piece as it is moved away from the stack. The stack of covers may be provided with package 148, which at a minimum comprises a bottom wall, 150, and more preferably with sidewalls 152 and a lid, 154. The sidewalls may be provided with a beveled edge, as at 156, which provides a friction-fit to the lid As shown in FIG. 16, the package may be provided with a attachment means, 162, such as a magnet, or releasable adhesive panel, to attach the package to an available surface, for one-handed deployment of the cover to the earpiece and mouthpiece. If no package is provided, the stack may carry a magnet or pressure sensitive adhesive layer at the bottom of the stack to attach the stack to an available surface for one-handed deployment of the covers. To enhance the rotary peel of the top cover from the rest of the stack, the; package, may be provided with an easily moldable but resilient layer, 160, such as a fluid-type reservoir. As shown in FIG. 15 the covers (and package parts) are square, however, circular template covers may also be used. What is critical to these covers is the radial pattern of adhesive, which will easily attach to any shaped earpiece an/or mouth piece.

U.S. Pat. No. 4,953,703 disclose stacked sheet covers which require separating sheets between each cover, increasing the cost of materials and manufacture, while making it nearly impossible to deploy covers on the earpiece and mouth piece using just one hand. U.S. Pat. No. 5,136,640 discloses another sheet cover having a separating layer, 16, to cover the adhesive. U.S. Pat. No. 4,570,038 discloses a "simplified structure" for a telephone cover, requiring round or square shapes to fit round or square phones. In addition, these simple covers, and the covers of U.S. Pat. No. 2,0507, 375 disclose two piece sheets, with continuous non-patterned adhesive.

To understand the extent of contamination of phones, random, cultures were made from both the mouth piece and the earpiece of telephones on New York City streets, in NY and Florida airports and foreign airports in the Caribbean, and from telephones in hospitals and hotel rooms. With one exception these cultures were all positive. The cultures showed the following bacterial species: Staphylococcus, bacillus, acinetobacter, tatumella, enterococus, aerococcus, pseudomonas, citrobacter, and stenotrophomonas. [Certain bacteria were not attempted to be cultured, due to the difficulty in culturing. Mycobacterium, is one such example.]

| Culture H7337009 | |
| --- | --- |
| Test Name | Results |
| CULTURE, ENVIRONMENTAL SOURCE | Airport Phone, Dec. 7, 1999, 10:54 am |
| STATUS | FINAL |
| ORGANISM 1 | FEW *STAPHYLOCOCCUS EPIDERMIDIS* |
| ORGANISM 2 | FEW *STAPHYLOCOCCUS HOMINIS* SUBSPECIES HOMINIS |
| SENSITIVITIES ORGANISM | FEW STAPHYLOCOCCUS EPIDERMIDIS SUBSPECIES HOMINIS |
| AMPICILLIN | S |
| AMPICILLIN SULBACTAM | S |
| CEPHALOTHIN | S |
| CIPROFLOXACIN | S     S = sensitive |
| CLINDAMYCIN | S |
| ERYTHROMYCIN | S     R = resistant |
| GENTAMICIN | S |
| OXACILLIN | S     I = Intermediate |
| PENICILLIN | S |
| TETRACYCLINE | I |
| TRIMETHOPRIM & SULFAMETH | S |
| SENSITIVITIES ORGANISM | FEW *STAPHYLOCOCCUS EPIDERMIDIS* |

-continued

| | |
|---|---|
| AMPICILLIN | S |
| AMPICILLIN SULBACTAM | S |
| CEPHALOTHIN | S |
| CLINDAMYCIN | S |
| ERYTHROMYCIN | S |
| GENTAMICINS | S |
| OXACILLIN | S |
| PENICILLIN | S |
| TETRACYCLINE | I |
| TRIMETHOPRIM & SULFAMETH | S |

Culture H7351106

| Test Name | Results |
|---|---|
| CULTURE, ENVIRONMENTAL SOURCE | Airport Phone, Dec. 23, 1999, 3:53 pm |
| STATUS | FINAL |
| ORGANISM 1 | MODERATE *STAPHYLOCOCCUS AURICULARIS* BETA-LACTAMASE PRODUCER |
| SENSITIVITIES ORGANISM | MODERATE *STAPHYLOCOCCUS AURICULARIS* |
| AMPICILLIN | R |
| AMPICILLIN SULBACTAM | S |
| CEPHALOTHIN | S |
| CIPROFLOXACIN | S |
| CLINDAMYCIN | S |
| ERYTHROMYCIN | R |
| GENTAMICIN | S |
| OXACILLIN | S |
| PENICILLIN | R |
| TETRACYCLINE | S |
| TRIMETHOPRIM & SULFAMETH | S |

Culture H7351133

| Test Name | Results |
|---|---|
| CULTURE, ENVIRONMENTAL SOURCE | Airport Phone, Dec. 7, 1999, 10:59 am |
| STATUS | FINAL |
| ORGANISM 1 | MANY *STENOTROPHOMONAS (X.) MALTOPHILIA* |
| ORGANISM 2 | MODERATE *CITROBACTER FREUNDII* |
| SENSITIVITIES ORGANISM | MANY *STENOTROPHOMONAS (X.) MALTOPHILIA* |
| AMOXICILLIN & CLAVULANATE | I |
| AMPICILLIN | R |
| AMPICILLIN SULBACTAM | R |
| CARBENICILLIN | R |
| CEFOXITIN | R |
| CEFTRIAXONE | R |
| CEFUROXIME | R |
| CEPHALOTHIN | R |
| CIPROFLOXACIN | I |
| GENTAMICIN | R |
| TETRACYCLINE | R |
| TRIMETHOPRIM & SULFAMETH | S |

Culture H7939187

| Test Name | Results |
|---|---|
| CULTURE, ENVIRONMENTAL SOURCE | Airport Phone, Dec. 07, 1999, 11:00 am |
| STATUS | FINAL |
| ORGANISM 1 | FEW *STAPHYLOCOCCUS AURICULARIS* |
| SENSITIVITIES ORGANISM | FEW *STAPHYLOCOCCUS AURICULARIS* |
| AMPICILLIN | R |
| AMPICILLIN SULBACTAM | R |
| CEPHALOTHIN | R |
| CIPROFLOXACIN | S |
| CLINDAMYCIN | S |
| ERYTHROMYCIN | S |
| GENTAMICIN | S |
| OXACILLIN | R |
| PENICILLIN | R |
| TETRACYCLINE | S |
| TRIMETHOPRIM & SULFAMETH | R |

Culture H7938036

| Test Name | Results |
|---|---|
| CULTURE, ENVIRONMENTAL SOURCE | Operating Room Recovery Room, Dec. 23, 1999, 3:58 pm |
| STATUS | FINAL |
| ORGANISM 1 | RARE *STAPHYLOCOCCUS EPIDERMIDIS* |
| SENSITIVITIES ORGANISM | RARE *STAPHYLOCOCCUS EPIDERMIDIS* |
| AMPICILLIN | R |
| AMPICILLIN SULBACTAM | S |
| CEPHALOTHIN | S |
| CIPROFLOXACIN | S |
| CLINDAMYCIN | S |
| ERYTHROMYCIN | S |
| GENTAMICIN | S |
| OXACILLIN | S |
| PENICILLIN | R |
| TETRACYCLINE | S |
| TRIMETHOPRIM & SULFAMETH | S |

Culture H7939178

| Test Name | Results |
|---|---|
| CULTURE, ENVIRONMENTAL SOURCE | Intensive Care Unit Nursing Station, Dec. 23, 1999, 3:55 pm |
| STATUS | FINAL |
| ORGANISM 1 | FEW *STAPHYLOCOCCUS EPIDERMIDIS* |
| SENSITIVITIES ORGANISM | FEW *STAPHYLOCOCCUS EPIDERMIDIS* |
| AMPICILLIN | R |
| AMPICILLIN SULBACTAM | S |
| CEPHALOTHIN | S |
| CIPROFLOXACIN | S |
| CLINDAMYCIN | S |

-continued

| | |
|---|---|
| ERYTHROMYCIN | S |
| GENTAMICIN | S |
| OXACILLIN | S |
| PENICILLIN | R |
| TETRACYCLINE | S |
| TRIMETHOPRIM & SULFAMETH | S |

Culture H7939187

| Test Name | Results |
|---|---|
| CULTURE, ENVIRONMENTAL SOURCE | IE Nursing Station, Dec. 23, 1999, 3:56 pm |
| STATUS | FINAL |
| ORGANISM 1 | FEW *STAPHYLOCOCCUS EPIDERMIDIS* |
| SENSITIVITIES ORGANISM | FEW *STAPHYLOCOCCUS EPIDERMIDIS* |
| AMPICILLIN | R |
| AMPICILLIN SULBACTAM | S |
| CEPHALOTHIN | S |
| CIPROFLOXACIN | S |
| CLINDAMYCIN | S |
| ERYTHROMYCIN | S |
| GENTAMICIN | S |
| OXACILLIN | S |
| PENICILLIN | R |
| TETRACYCLINE | S |
| TRIMETHOPRIM & SULFAMETH | S |

Culture H7939196

| Test Name | Results |
|---|---|
| CULTURE, ENVIRONMENTAL SOURCE | Hall Phone, Dec. 23, 1999, 3:53 pm |
| STATUS | FINAL |
| ORGANISM 1 | FEW *ENTEROCOCCUS FAECALIS* |
| ORGANISM 2 | RARE *STAPHYLOCOCCUS AURICULARIS* |
| SENSITIVITIES ORGANISM | RARE *STAPHYLOCOCCUS AURICULARIS* |
| AMPICILLIN | R |
| AMPICILLIN SULBACTAM | R |
| CEPHALOTHIN | R |
| CIPROFLOXACIN | R |
| CLINDAMYCIN | R |
| ERYTHROMYCIN | R |
| GENTAMICIN | R |
| OXACILLIN | R |
| PENICILLIN | R |
| TETRACYCLINE | R |
| TRIMETHOPRIM & SULFAMETH | S |
| SENSITIVITIES ORGANISM | FEW *ENTEROCOCCUS FAECALIS* |
| AMPICILLIN | S |
| CIPROFLOXACIN | S |
| ERYTHROMYCIN | I |
| PENICILLIN | S |
| TETRACYCLINE | R |

Culture H7939202

| Test Name | Results |
|---|---|
| CULTURE, ENVIRONMENTAL SOURCE | Hall Phone, Dec. 23, 1999, 3:53 pm |
| STATUS | FINAL |
| ORGANISM 1 | FEW *STAPHYLOCOCCUS EPIDERMIDIS* |
| SENSITIVITIES ORGANISM | FEW *STAPHYLOCOCCUS EPIDERMIDIS* |
| AMPICILLIN | R |
| AMPICILLIN SULBACTAM | S |
| CEPHALOTHIN | S |
| CIPROFLOXACIN | S |
| CLINDAMYCIN | S |
| ERYTHROMYCIN | S |
| GENTAMICIN | S |
| OXACILLIN | S |
| PENICILLIN | R |
| TETRACYCLINE | S |
| TRIMETHOPRIM & SULFAMETH | S |

While these examples illustrate the risk in very particular settings, efforts to counter the more general risk extend to additional infectious agents.

We claim:

1. A sanitary cover for a telephone handset comprising:
a template of barrier material, comprising a continuous layer of porous non-woven fabric;
said material provided with flexible, resilient portions, along the outer pleat at both sides of said template, to form a stick shape.

2. The sanitary cover of claim 1 further comprising:
ends of said stick firmly secured with staples, plastic or heat welded.

3. The sanitary cover of claim 1 further comprising:
a non-slip coating placed on inside portions of said resilient portions.

4. The sanitary cover of claim 3 wherein said non-slip coating comprises silicon or rubber.

5. The sanitary cover of claim 1 wherein said cover is made from biodegradable sheet material.

6. A method for securing a sanitary cover to a telephone handset comprising:
pressing two ends of a sanitary cover stick toward each other;
expanding a flexible resilient portion to expand pleats;
disposing said cover about an end of an earpiece or mouthpiece;
releasing said pressure at said ends of said stick;
closing and securing said cover on said earpiece or mouthpiece.

7. A sanitary cover for a telephone handset comprising:
continuous strips joined to the edges of a continuous layer of porous, bacteria proof, non-woven fabric by adhesive or heat sealing to form a stick shape;
said at strips constructed of a flexible and resilient material.

8. The sanitary cover of claim 7 wherein said strips have a resilient arch.

9. The sanitary cover of claim 7 wherein said strips are made of card board or plastic.

10. A method of making a sanitary cover for a telephone handset comprising:

joining edges of continuous strips to edges of a continuous layer of porous, bacteria proof nonvoven fabric;

forming a strip/fabric layer composite;

folding said strip/fabric layer composite a number of times;

securing ends of said strip/fabric layer composite to form a stick shape.

11. The method of claim 10 wherein said strips are joined to said porous layer by heat sealing or an adhesive.

* * * * *